Patented July 8, 1930

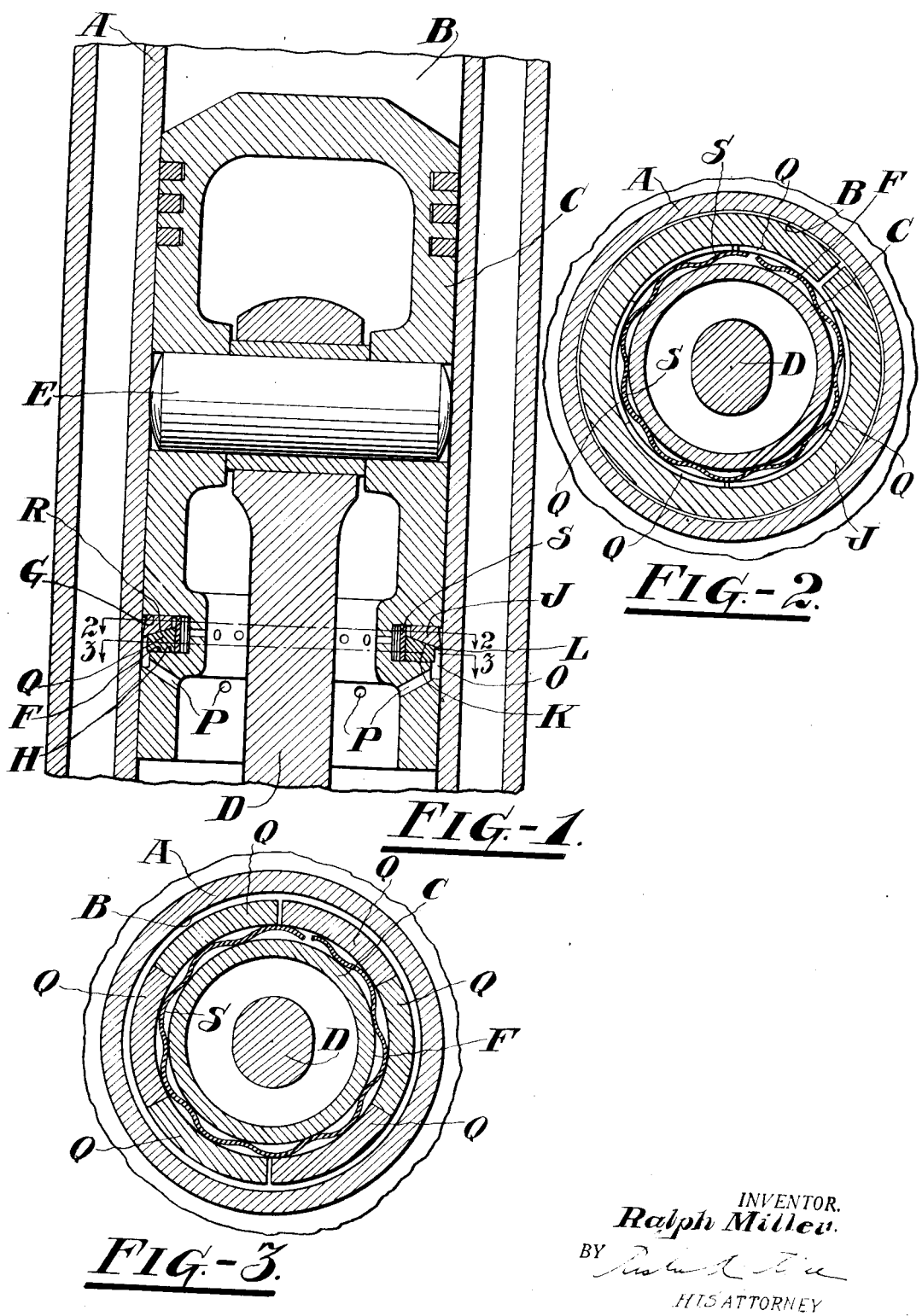

1,770,142

UNITED STATES PATENT OFFICE

RALPH MILLER, OF EASTON, PENNSYLVANIA, ASSIGNOR TO INGERSOLL-RAND COMPANY, OF JERSEY CITY, NEW JERSEY, A CORPORATION OF NEW JERSEY

OIL SCRAPER

Application filed June 5, 1929. Serial No. 368,590.

This invention relates to engines, but more particularly to an oil scraper adapted to be carried by a piston to act against the wall of the cylinder.

It is an object of the invention to prevent the passage of an excessive amount of oil along the cooperating surfaces of the piston and the cylinder into the upper portion of the cylinder, as for instance, the combustion chamber of an internal combustion engine.

Other objects will be in part obvious and in part pointed out hereinafter.

In the drawings illustrating the invention and in which similar reference characters refer to similar parts, Figure 1 is a sectional elevation of so much of an engine as will serve to illustrate the invention, and Figures 2 and 3 are transverse views taken through Figure 1 on the lines 2—2 and 3—3 looking in the direction indicated by the arrows.

Referring more particularly to the drawings, A represents a cylinder having a piston chamber B in which is disposed a reciprocatory piston C. The piston C is provided with the usual connecting rod D connected operatively to the piston by means of a wrist pin E.

In accordance with the practice of the invention, means are provided for removing from the wall of the cylinder B any excessive amount of lubricant which may find its way between the cooperative surfaces of the cylinder B and the piston C. To this end the piston C is provided with an annular ring groove F of which the end walls G and H are preferably parallel to each other.

Within the groove F is disposed a scraper ring J having at one end an inclined surface K and with its opposite end seats against the wall G of the groove. Preferably the periphery of the ring J is of conical form, that is, the periphery has a back taper to form a knife edge L at the juncture of the periphery of the ring and the inclined surface K. The arrangement is such that during the reciprocation of the piston the knife edge L will, by bearing against the wall of the cylinder B, scrape therefrom any excess oil which may have been deposited thereon. Such oil will then flow into a shallow oil groove O which is located below and is in communication with the ring groove F and also with the interior of the piston C through a passage, or as illustrated in the drawings, through a plurality of passages P in the cylinder.

Means are provided for constantly holding the end of the ring J in fluid tight relationship with the wall G of the groove. In furtherance of this end a plurality of segmental members Q are disposed in the ring groove to seat with one end against the wall H of said groove. The members Q are provided with inclined surfaces R of the same degree of inclination as the inclined surface K of the ring against which they bear.

Disposed in the innermost end of the groove F and therefore rearwardly of the segmental members Q is a spring ring S, preferably of the corrugated type, which acts against the bottom of the groove F and also against the segmental members to constantly urge the said members Q radially outward. The pressure thus exerted by the spring S tends to expand the ring J so that the knife edge L will be held in close contact with the wall of the cylinder B, and at the same time, by forcing the members Q underneath the ring J, the said ring will be pressed firmly against the wall G of the groove to prevent the flow of oil along these surfaces and into the upper portion of the cylinder.

I claim:

1. In an oil scraper, the combination of a cylinder and a piston in the cylinder, a ring groove in the piston, a ring in the groove and having an inclined surface at one end, an edge on the ring to scrape oil from the cylinder, segments in the groove having inclined surfaces bearing against the inclined surface of the ring, a spring ring in the ring groove to press the segments radially outward, thereby tending to expand the ring for maintaining the edge in contact with the cylinder and pressing the ring into fluid tight relationship with the wall of the groove, and a passage in the piston located below the ring groove and communicating therewith to remove the oil scraped from the cylinder by the said ring.

2. In an oil scraper, the combination of a cylinder and a piston in the cylinder, a ring groove in the piston, a ring in the ring groove and having an inclined surface at one end, segments disposed loosely in the ring groove and having inclined surfaces to bear against the inclined surface of the ring, an edge on the ring to scrape oil from the cylinder, an oil groove in the piston located below the ring groove and communicating therewith, said piston having a passage for conveying oil from the oil groove to the interior of the piston, and a spring ring in the groove to press the segments radially outward for expanding the ring and for pressing the end of the ring into fluid tight relationship with the wall of the cylinder.

In testimony whereof I have signed this specification.

RALPH MILLER.